C. R. MITCHELL.
MILKING MACHINERY.
APPLICATION FILED JULY 7, 1910.

998,856.

Patented July 25, 1911.
5 SHEETS—SHEET 1.

WITNESSES

INVENTOR
Charles Robert Mitchell

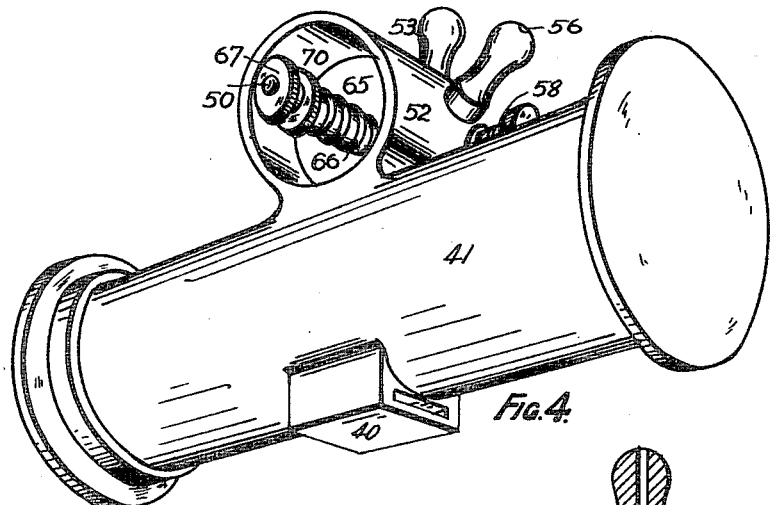
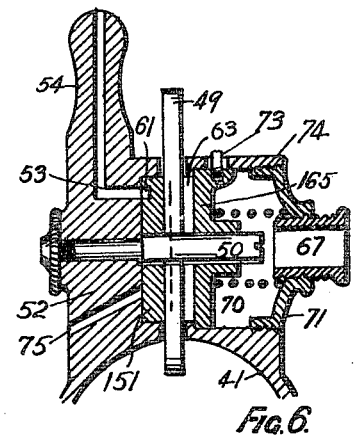
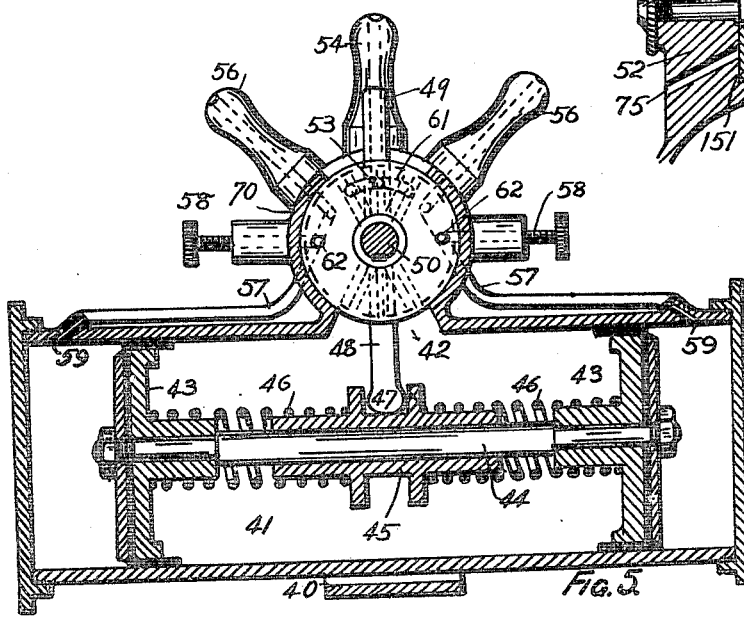

C. R. MITCHELL.
MILKING MACHINERY.
APPLICATION FILED JULY 7, 1910.
998,856.
Patented July 25, 1911.
5 SHEETS—SHEET 3.
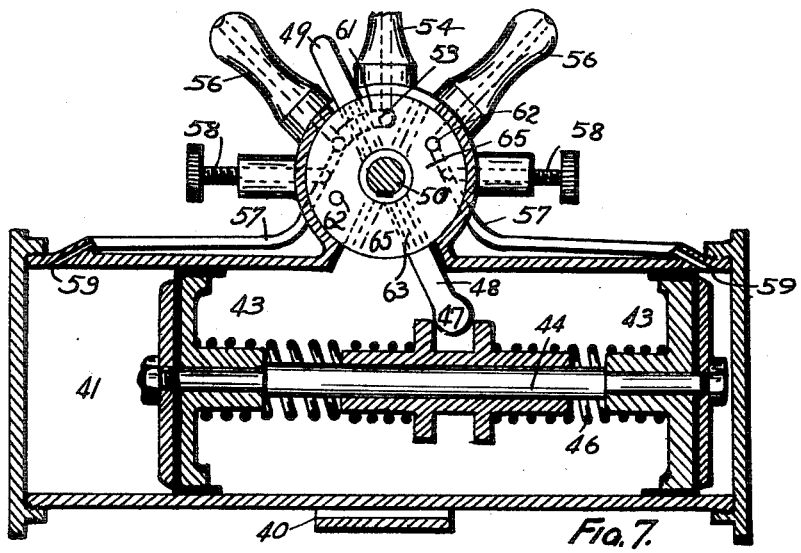
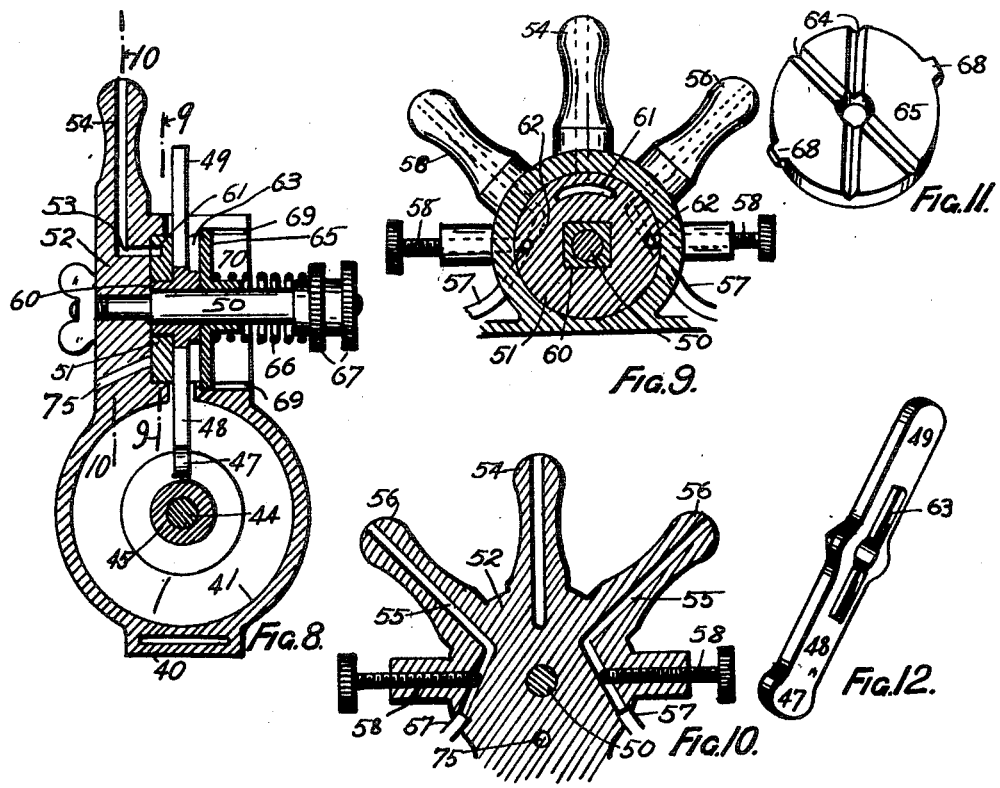
WITNESSES
W. P. Burk
L. Najek
INVENTOR
Charles Robert Mitchell
BY
Wm. Wallace White
ATTY

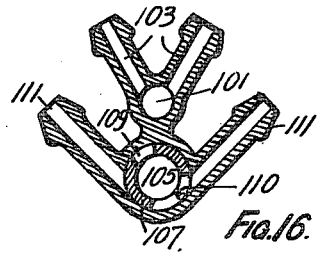
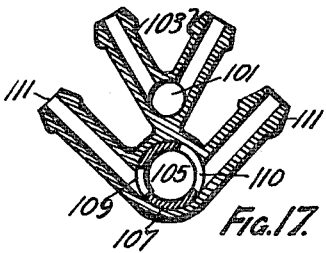
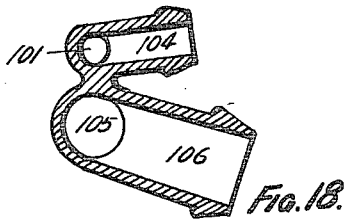
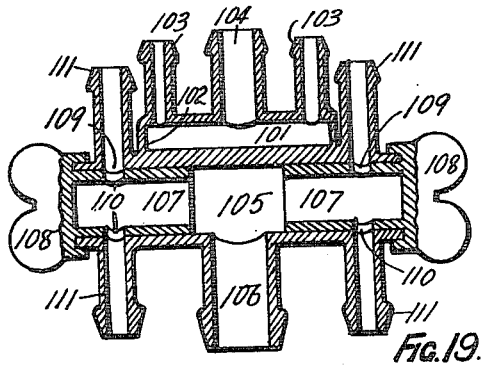
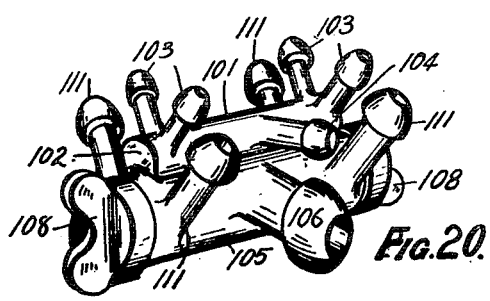

UNITED STATES PATENT OFFICE.

CHARLES ROBERT MITCHELL, OF CHATSWOOD, NEAR SYDNEY, NEW SOUTH WALES, AUSTRALIA.

MILKING MACHINERY.

998,856.  Specification of Letters Patent.  Patented July 25, 1911.

Application filed July 7, 1910. Serial No. 570,781.

*To all whom it may concern:*

Be it known that I, CHARLES ROBERT MITCHELL, a subject of the King of Great Britain, residing at Victoria avenue, Chatswood, near Sydney, in the State of New South Wales and Commonwealth of Australia, engineer, have invented new and useful Improvements in Milking Machinery, of which the following is a specification.

This invention relates to certain parts or instrumentalities of milking machinery whereby the construction and functions of those several parts are much improved and the operation of extracting milk from the animal as a whole greatly facilitated. These improvements in milking machinery have relation first to devices for automatically cutting off the power as suction from the animal's teat when milk has ceased to flow and hereinafter termed the "cut off"—secondly to the device or devices for imparting pulsation to the teat cups or as heretofore termed the pulsator; thirdly to the device for attachment to the animal's teat or the teat cup and fourthly to a device or devices for convenient connection of the teat cups to the pulsator or milk receiver and hereinafter termed the cluster. But in order that this invention may be clearly understood these present improvements will be particularly described with reference to the drawings accompanying and forming part of this complete specification.

Figure 1:
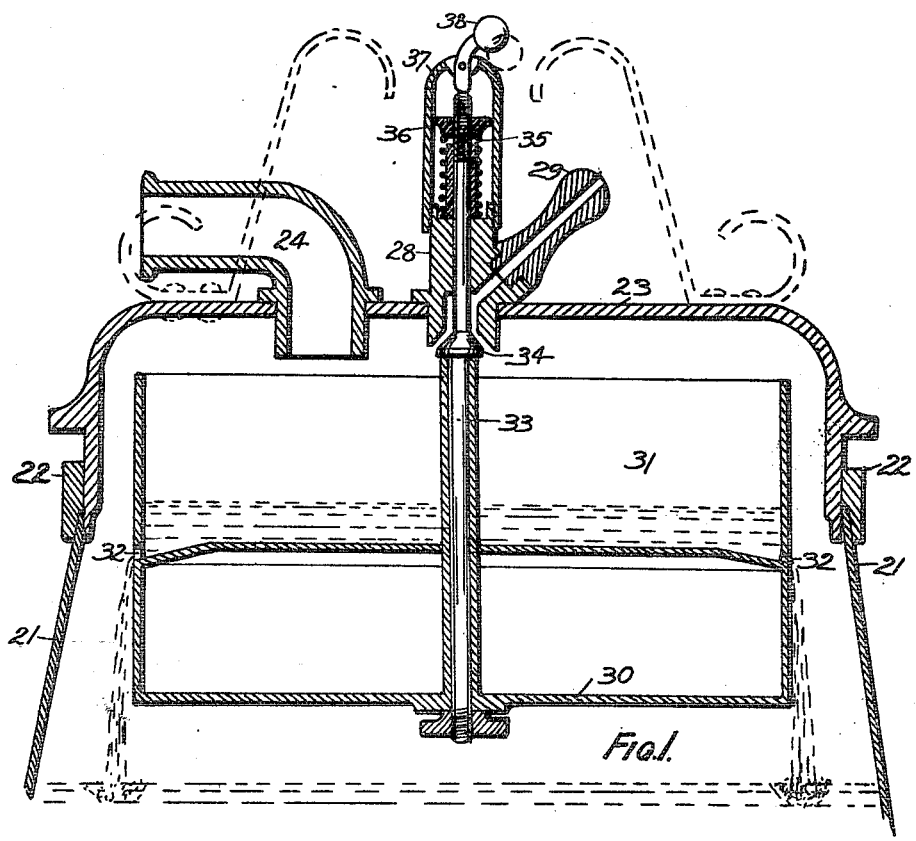
Figure 2:
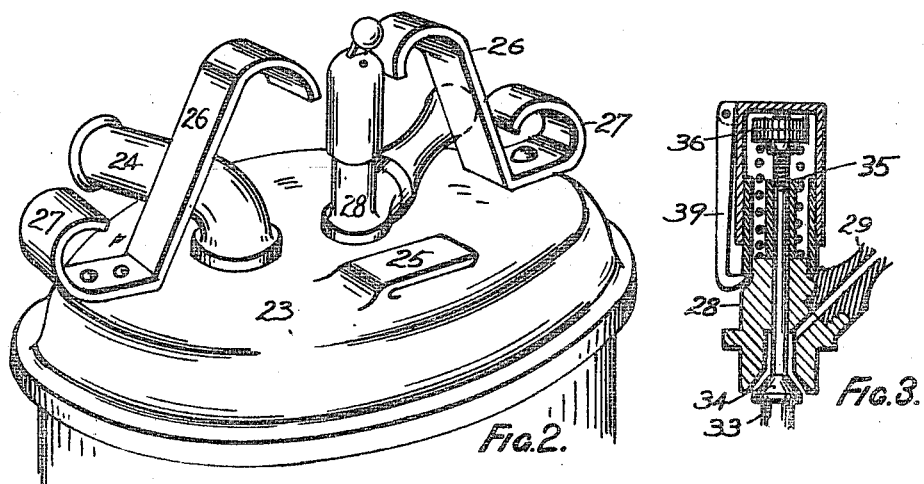
Figure 13:
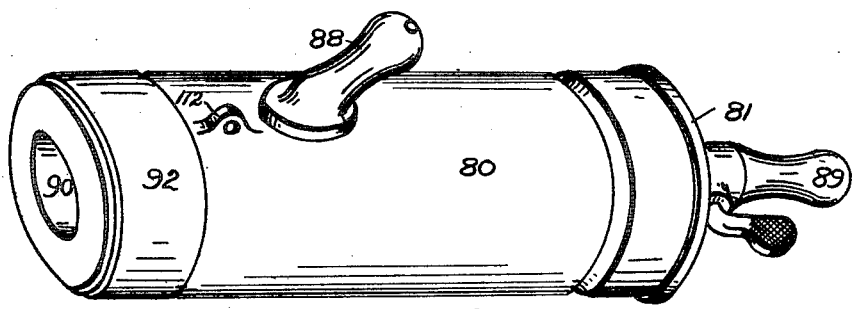
Figure 14:
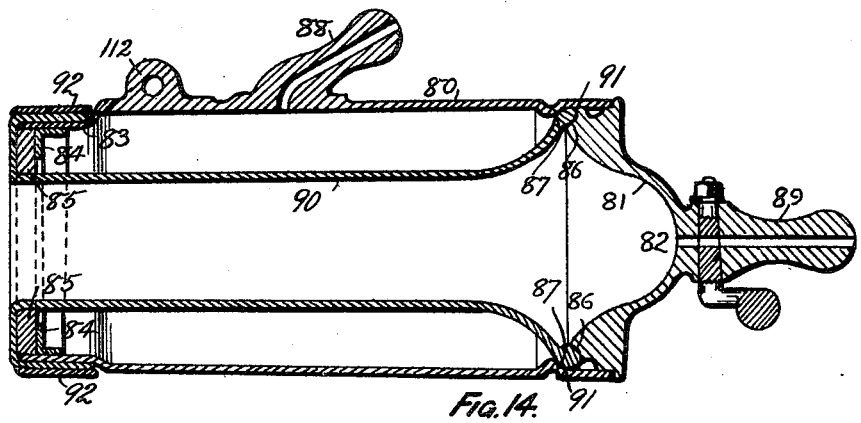
Figure 15:
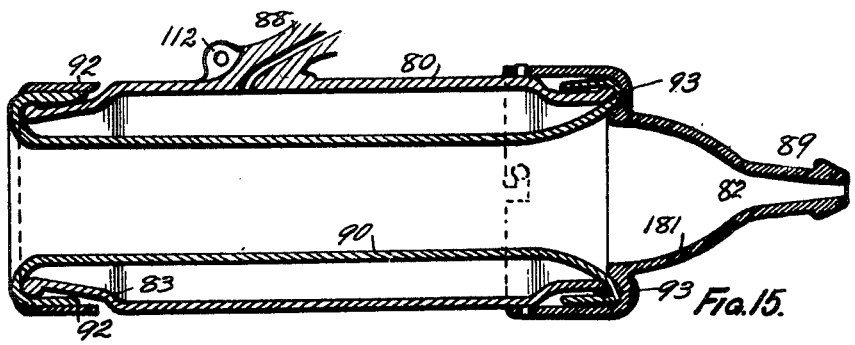

Figure 1 is a sectional elevation of the top or cover of a milk receiver carrying a cut off according to this invention. Fig. 2 is a perspective view of the same and Fig. 3 a sectional view of a modified construction of the cut off valve latch. Fig. 4 is a perspective view of an improved pulsator according to this invention. Fig. 5 is a sectional elevation of the same in mid stroke. Fig. 6 is a central section of same with a modified construction of valve keeper. Fig. 7 is a similar view to Fig. 5 with the piston at the end of a stroke. Fig. 8 is a central section of same. Figs. 9 and 10 are sections on the lines 9—9 and 10—10 respectively in Fig. 8 and Figs. 11 and 12 are perspective views respectively of the valve keeper and valve lever thereof. Fig. 13 is a perspective view of an improved teat cup according to this invention. Fig. 14 is a central section of the same and Fig. 15 is a central section of a modified construction thereof. Figs. 16 and 17 are diagrammatic cross sections of a cluster or improved claw according to this invention. Fig. 18 is a mid section. Fig. 19 is a diagrammatic longitudinal section of same and Fig. 20 is a perspective view of such cluster.

Figure 3:
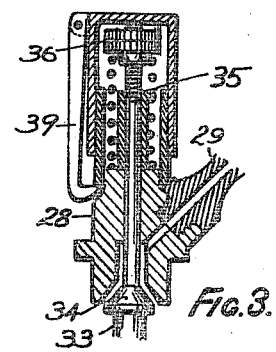

Referring to the cut off as shown in Figs. 1 to 3 the top or cover 23 tightly closes the milk receiver 21 at the fitting ring 22 and is connected to the source of suction by branch 24 and it has clip piece 25 for a pulsator and handles 26 with hooks 27 for the claws or clusters or teat cups. And the bail or handle of the receiver may pass right over all the top gear. In the center of the cover 23 is a plug 28 having a nipple 29 for connection to the teat cups. Below this cover 23 and in the receiver is a float 30 above which is a cup 31 having one or more escape orifices or discharge perforations 32 at its lowest and outer periphery. A stem 33 passing through the float and cup carries a valve 34 seating upwardly in the plug 28 and it extends at top clear of said plug where it carries a spring 35 whose tension is regulated by milled nut 36. A cap 37 screws on to said plug 28 carrying at its upper end a latch or trigger 38 adapted temporarily to keep the valve 34 clear of its seat and the passage from the teat cups to the milk receiver open. In the modification shown in Fig. 3 the cap 37 fits over an extension of the plug 28 and it has a latch or catch 39 to take under such extension or under a stop on said plug and so temporarily hold the valve 34 open. The lever 39 is weighted and it is released from its catching position when the valve is subjected to the suction in the receiving vessel.

Now so long as milk is flowing from the animal through the teat cups and to the milk receiver it finds its way into the cup 31 and by its weight therein (because it cannot escape except through perforations 32 and at an arbitrarily fixed speed) depresses said cup and the float 30 and so further opens the valve 34 and at the same time releases the trigger 38 or latch 39 leaving the valve 34 free to close. The trigger 38 or latch 39 not now controlling the spindle 33 the spring 35 would draw the valve 34 to its seat were it not that the quantity of the milk in the cup 31 is so regulated by reason of the size and number of the perforations 32 that its weight overcomes the power of said spring. But when most of the milk escapes from the cup 31 and there is none flowing into said cup to replace it the tension of the spring 35 closes the valve 34 and the power of suction is cut off from the milk receiver and teat cups, &c., and so the animal is not distressed. And in addition when the milk receiver becomes sufficiently full the flotation power of the hollow or float 30 overcomes the weight of the milk in the cup 31 and so raises valve 34 to its seat with like cut off effect and so prevents milk passing into the vacuum piping and creating a nuisance and waste of milk.

As illustrated in Figs. 4 to 12 the improved pulsator according to this invention is one of the pneumatically operated class adapted to alternately admit vacuum and atmospheric pressure to the teat cups. The cylinder 41 adapted to be fastened to its support say the top of a milk receiver or say to the vacuum piping by slotted foot 40 is medially gapped at 42 and contains two pistons 43 on either end of piston rod 44 on which floats a collared sleeve 45 maintained normally in medial position by helical springs 46. Between the collars of the sleeve 45 rides the circular end 47 of the valve operating lever 48 which is pivoted or fulcrumed on the stem 50 of the oscillating disk valve 51 and which has an extension handle 49. This valve 51 seats upon an extension piece 52 from the cylinder 41 to which the stem 50 is affixed and wherein is a port 53 from nipple 54 which has a flexible connection to branch 29 of the milk receiver or to the vacuum piping and wherein also are ports 55 from nipples 56 (two being shown for two sets of teat cups) having flexible connection to teat cups or to claws or clusters of the teat cups. These ports 55 continue by passages and pipes 57 to either end of the cylinder 41 which they enter by orifices 59 and in either passage is a screw cut-off or adjusting valve 58. The valve 51 has a square orifice to take the square boss 60 of the valve lever 48 so that said valve will be circularly oscillated by the movement of said lever 48. The working face of the valve 51 has a recessed port 61 adapted to connect on either side of it the port 53 to the port 55 and this valve 51 also has two through ports 62 adapted to open the ports 55 to the atmosphere at the ends of the valve travel. A passage 75 may be provided for lubricating this working face. The lever 48 has a ridge or protruding slat 63 on the face opposite its square boss 60 adapted to fit in corresponding grooves 64 on a non-rotatable tension disk or keeper 65 threaded on valve stem 50 and held in frictional contact with said lever 48 by helical spring 66 under adjusting nuts 67. The valve keeper 65 is held from rotation by lugs 68 taking in grooves 69 in the valve chamber 70. In the modification shown in Fig. 6 this chamber 70 has a cover 71 through which the adjusting nut 67 is screwed and the disk 165 is prevented from revolving by pin 73 in slot 74 while the valve 151 is recessed to the lever 48. The falling into the groove 64 of the ridges 63 acts as a check and limit to the movement or oscillation of said lever 48 and consequently of the disk valve 51 and said valve is so held in place with the proper ports in position until the lever 48 has its return impulse given by the movement of the pistons 43 and which impulse will not be given until the vis-inertia of the floating sleeve 45 is overcome by the reaction of the spring which is compressed by the first movement of return of the piston or until the piston neck moves against the sleeve 45 when the movement will be sudden and quick.

In operation the vacuum being admitted by the flexible connection on nipple 54 the handle 49 is operated manually if it should be in the position shown in Fig. 5 (or in any position other than at the end of its oscillation) to one of its end positions when the vacuum will exert itself through port 53 port 61 in disk valve 51 and port 55 (shown as on the left-hand side in Fig. 7) and through the nipple and flexible connection to the pulsation space of the teat cup &c. and so create suction or pulsation thereon. And at the same time the vacuum will exert itself with effect according to the regulation of the valve 58 through the passage and port 57 in the cylinder 41 at that end and draw the piston thereto and so reverse under the tensional impulse before mentioned the position of the lever 48 and the valve 51 whereby the vacuum will be exerted through the other nipple 56 and the valve 51 be again oscillated and so on.

The improved teat cup of this invention as shown in Figs. 13, 14 and 15 is of the two chambered class wherein a flexible sleeve or inflator is within a rigid casing and it is constructed so that with easily interchangeable washers it can be made suitable for various sizes of teats and so that an action in imitation of the calf will be imparted to the teat cup. The casing 80 is of metal and it fits tightly upon a base 81 which has a wide central space 82 for the bottom end of the teat so that it will not be blocked. This casing 80 at its upper end is reduced in diameter at 83 and has a shelf or brackets 84 on which to support a ring or washer 85 say of stout rubber and of any section (though rectangular section as shown is as good as any other). Rings or washers 85 are made of various sizes of internal diameter and are interchangeable so that the upper orifice of the teat cup may be made of any desired size to suit the teats of particular cows. The inner flexible sleeve or inflator 90 is of rubber and is cylindrical though it has a bead 91 on its lower end which bead is placed by stretching the lower end of said sleeve to a flaring shape in the groove 86 of the base 81 and the casing 80 with internal bead 87 is forced over said bead 91 and makes a tight joint. The upper end of said sleeve 90 is stretched over the ring or washer 85 and over the reduced neck 83 and over it is placed the tight metal keeper ring 92. The casing 80 has a lug 112 for a hanging eye and a nipple 88 for a flexible connection to an intermittent suction or a pulsation pipe. The base 80 has a cock and nipple 89 for connection to a vacuum pipe. In the modification shown at Fig. 15 the sleeve 90 at the top is identical with that just described though it is shown as affixed to the casing 80 without an interchangeable ring or washer 85 although one might be provided for and used. At the bottom the sleeve 90 is stretched to a flaring shape around a beaded neck 93 and the base 181 with large central space 82 for the 'end of the teat is tightly fitted over the turn of the sleeve and the casing by means of a bayonet jointing or other fastening. It is to be noted that this modified teat cup may be adapted to be comfortably used on two different sized teats by reversing the position of the keeper ring and the base on the casing whose end orifices of course would be of different diameters. In this case to facilitate this reversal the direction of the nipple 88 would be adjustable. The functions of the various parts of this teat cup need no explaining but it may be mentioned that the ring or washer 85 or the top turn of the sleeve 90 maintains a firm grip upon the teat and that on an intermittent vacuum or pulsation action being set up between the casing 80 and the sleeve 90 combined with a vacuum set up in the sleeve 90 a slightly reciprocating or tossing motion will be given to the teat cup in almost perfect imitation of the muscular action of the head of a calf when sucking and so the cow will be properly and completely milked. Also it is to be noted that it is only necessary to remove the keeper ring 92 which is quickly done and to substitute a ring or washer 85 with a different internal diameter to make the teat cup perfectly suitable for another animal with teats of a different size.

Referring to Figs. 16 to 20 these illustrate an improved claw or as termed herein a cluster for the convenient disposition of the flexible connection from the milk receiver and the flexible connections to four chambered teat cups and provided with cut off for one or two of the teat cup connections and with removable parts to facilitate cleansing of said cluster. The two pipes or chambers 101 and 105 are in the one casing or casting. The former chamber 101 for the intermittent vacuum or pulsating connections has closed ends 102 and four nipples 103 for flexible connections to the space between the inflator or teat sleeve and the casing of the teat cup and it has a branch or connection with nipple 104 for the flexible connection to the intermittent vacuum or the pulsation piping. The other chamber 105 has a mid branch with nipple 106 for connection to the milk receiver or vacuum piping (say to the nipple 29 of the inlet to the milk receiver) and its two ends are bored and have hollow plugs 107 (with turn-ends 108) fitted therein with ports 109 and 110 adapted to take into juxtaposition with the bores of two of the four nipples 111 for the flexible connection to the base of the teat cups or the inflator thereof. These ports 109 and 110 of each plug are of such construction that they may be positioned in relation to the nipple bores 111 so that both nipples are cut off from the chamber or pipe 105 and their connections be thus out of action or so that one only of such nipples (Fig. 16) or the two of them (Fig. 17) may be operative. The plugs 107 are easily removed from the bored ends of the chamber or pipe 105 and the whole may thus be the more easily cleansed.

Having now fully described and ascertained my said invention and the manner in which it is to be performed I declare that what I claim is:—

1. In a milking machine, in combination, a cover of a milk receiver connected with a source of suction and provided with an orifice adapted to be connected with teat cups, a receiving cup provided with a small escape opening positioned within the receiver and adapted to move in a vertical direction, a valve operatively connected with said cup and adapted to coact with said orifice to open and close the same, means normally tending to hold said cup in its raised position and said valve in its closed position, and normally inoperative means adapted to hold said cup in its lowered position and said valve in its open position until the weight of the liquid in said cup overcomes the closing tendency of said first mentioned means, said second mentioned means automatically returning to its normally inoperative position whereby when the liquid flows from said cup said first mentioned means will return said cup to its normally inoperative position thereby causing the said valve to close said orifice.

2. In a milking machine, in combination, a cover of a milk receiver connected with a source of suction and provided with an orifice adapted to be connected with teat cups, a receiving cup provided with a small escape opening positioned within the receiver and adapted to move in a vertical direction, a valve operatively connected with said cup and adapted to coact with said orifice to open and close the same, means normally tending to hold said cup in its raised position and said valve in its closed position, said receiving cup being provided with a float adapted to be lifted by the liquid in the receiver to raise the cup and close the valve when the liquid in the receiver reaches a certain level, and normally inoperative means adapted to hold said cup in its lowered position and said valve in its open position until the weight of the liquid in said cup overcomes the closing tendency of said first mentioned means, said second mentioned means automatically returning to its normally inoperative position, whereby when the liquid flows from said cup said first mentioned means will return said cup to its normally inoperative position, thereby casuing the said valve to close said orifice.

3. In a milking machine, in combination, a cover of a milk receiver connected with a source of suction and provided with an orifice adapted to be connected with teat cups, a receiving cup provided with a small escape opening positioned within the receiver and adapted to move in a vertical direction, a stem operatively connected to said cup and movable therewith, a valve carried by said stem and adapted to open and close said orifice, a spring operatively associated with said stem and tending to hold said valve in closed position, means for adjusting the tension of said spring and normally inoperative means adapted to coact with said stem to maintain said valve in its open position.

4. In a milking machine of the class described, a pulsator comprising a cylinder provided with an opening intermediate its ends, a piston rod therein, two pistons mounted upon said rod adjacent the ends thereof, a sleeve slidingly mounted on said rod between said pistons, an oscillating valve, a valve actuating lever adapted to be operated by said sleeve, a valve seat provided with a port adapted to be connected to a source of suction, said valve seat being provided with a pair of ports adapted to be connected with the teat cups, and conduits extending between said pair of ports and the ends of said cylinder, said valve being provided with passages for alternately placing one of said pair of ports in connection with said first mentioned port and the other of said pair of ports in communication with the atmosphere.

5. In a milking machine of the class described, a pulsator comprising a cylinder provided with an opening intermediate its ends, a piston rod thereon, two pistons mounted upon said rods adjacent the ends thereof, a collared sleeve slidingly mounted on said rod between said pistons, springs interposed between said pistons and said collar for maintaining said sleeve normally midway between the pistons, an oscillating valve, a valve actuating lever adapted to be operated by said sleeve, a valve seat provided with a port adapted to be connected to a source of suction, said valve seat being provided with a pair of ports adapted to be connected with the teat cups, and conduits extending between said pair of ports and the ends of said cylinder, said valve being provided with passages for alternately placing one of said pair of ports in connection with said first mentioned port and the other of said pair of ports in communication with the atmosphere.

6. In a milking machine of the class described, a pulsator comprising a cylinder provided with an opening intermediate its ends, a piston rod therein, two pistons mounted upon said rods adjacent the ends thereof, a collared sleeve slidingly mounted on said rod between said pistons, springs interposed between said pistons and said collar for maintaining said sleeve normally midway between the pistons, an oscillating valve, a valve actuating lever adapted to be operated by said sleeve, a valve seat provided with a port adapted to be connected to a source of suction, said valve seat being provided with a pair of ports adapted to be connected with the teat cups, and conduits extending between said pair of ports and the ends of said cylinder, said valve being provided with passages for alternately placing one of said pair of ports in connection with said first mentioned port and the other of said pair of ports in communication with the atmosphere, said valve being provided with a ridge, a non-rotatable keeper provided with grooves adapted to engage said ridge whereby the valve is held in position, and means yieldingly holding said keeper in contact with said valve.

7. In a teat cup, in combination, a casing, a base therefor at one end thereof, an interchangeable washer adjacent the other end of the casing, means for holding said washer in position, a flexible inflator positioned within said casing and having its lower end affixed to the base and its upper end turned over the washer and over the upper end of the casing, and a ring embracing the upper end of the casing for holding the turned over end of the flexible inflator in position.

8. In a teat cup, in combination, a casing, a base therefor adjacent the lower end thereof, a flexible inflator within said casing and having its lower end secured to said base, means for securing the upper end of said inflator to the upper end of said casing, and interchangeable means within said casing adjacent its upper end for varying the size of the orifice of the flexible inflator.

9. In a teat cup, in combination, a casing, a base therefor adjacent the lower thereof, a flexible inflator within said casing and having its lower end secured to said base, the upper end of said inflator being turned over the upper end of the casing, a ring embracing the upper end of the casing to hold the turned over end of the inflator in position, and an interchangeable washer positioned within said casing adjacent its upper end and surrounding said inflator whereby a washer of different diameter may be substituted therefor to vary the size of the orifice of the inflator.

10. In a milking apparatus, in combination, a cluster provided with a pulsation chamber, an inlet nipple communicating therewith and a plurality of outlet nipples communicating therewith, said cluster being further provided with a vacuum chamber, an inlet nipple communicating therewith and a plurality of outlet nipples communicating therewith, said vacuum chamber being provided with removable end members.

11. In a milking apparatus, in combination, a cluster provided with a pulsation chamber, an inlet nipple communicating therewith and a plurality of outlet nipples communicating therewith, said cluster being further provided with a vacuum chamber, an inlet nipple communicating therewith and a plurality of outlet nipples communicating therewith, said vacuum chamber being provided with removable end members having inwardly extending plug portions provided with ports adapted to register with said second mentioned plurality of outlet nipples.

In testimony whereof I have signed my name to this specification in the presence of two subscribing witnesses.

CHARLES ROBERT MITCHELL.

Witnesses:
PERCY NEWELL, Jr.,
O. MACINNES.